United States Patent
Masuda

(10) Patent No.: US 8,123,410 B2
(45) Date of Patent: Feb. 28, 2012

(54) ROLLING BEARING DEVICE

(75) Inventor: Yoshinori Masuda, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 451 days.

(21) Appl. No.: 12/289,967

(22) Filed: Nov. 7, 2008

(65) Prior Publication Data

US 2009/0123101 A1    May 14, 2009

(30) Foreign Application Priority Data

Nov. 8, 2007   (JP) ................................ 2007-290476

(51) Int. Cl.
*F16C 33/78*   (2006.01)
(52) U.S. Cl. ......... 384/448; 384/488; 384/480; 384/544
(58) Field of Classification Search .................. 384/480, 384/484, 486, 488, 544, 589, 448
See application file for complete search history.

(56) References Cited

U.S. PATENT DOCUMENTS

| | | | |
|---|---|---|---|
| 4,427,242 A | 1/1984 | Otto | |
| 6,550,975 B2 * | 4/2003 | Inoue et al. | 384/537 |
| 6,637,943 B2 * | 10/2003 | Novak et al. | 384/477 |
| 6,682,221 B2 | 1/2004 | Rutter et al. | |
| 7,011,451 B2 * | 3/2006 | Tajima et al. | 384/448 |
| 7,445,388 B2 | 11/2008 | Shigeoka et al. | |
| 2002/0110299 A1 * | 8/2002 | Schote | 384/544 |
| 2002/0131659 A1 | 9/2002 | Rutter et al. | |
| 2007/0147718 A1 | 6/2007 | Takimoto | |
| 2007/0154124 A1 * | 7/2007 | Inoue et al. | 384/488 |
| 2007/0172163 A1 * | 7/2007 | Yamamoto | 384/448 |

FOREIGN PATENT DOCUMENTS

| | | |
|---|---|---|
| JP | 2000-071710(A) | 3/2000 |
| JP | 2000-221202(A) | 8/2000 |
| JP | 2000-221203(A) | 8/2000 |
| JP | 2000-221204(A) | 8/2000 |
| JP | 2000-221205(A) | 8/2000 |
| JP | 2001-215132 | 8/2001 |
| JP | 2003-130069 | 5/2003 |
| JP | 2004-116713 | 4/2004 |

(Continued)

OTHER PUBLICATIONS

European Search Report dated Mar. 5, 2009.

(Continued)

*Primary Examiner* — Thomas R Hannon
(74) *Attorney, Agent, or Firm* — McGinn IP Law Group, PLLC

(57) ABSTRACT

In a rolling bearing provided with an outer ring connected to a mounting opening of a knuckle, an inner ring connected to a wheel through a hub, a rolling element intervening between the outer ring and the inner ring and a sealing device for sealing the space between the inner and outer rings from the outside, the rolling bearing is provided with a sealing member for limiting the foreign substance invading the rolling bearing side from a clearance existing between a drive shaft provided rotatably with the inner ring and the knuckle, the sealing member including a ring-shaped cover including a cylinder press-fit in the outer ring and a ring-shaped upstanding wall extended radially inwardly from the cylinder and an outer lip provided at an inner diameter end of the ring-shaped upstanding wall, the outer lip serving to show the sealing function in cooperation with the drive shaft.

7 Claims, 19 Drawing Sheets

FOREIGN PATENT DOCUMENTS

| | | |
|---|---|---|
| JP | 2005-30547 | 2/2005 |
| JP | 2005-299768 | 10/2005 |
| JP | 2005-308151 | 11/2005 |
| JP | 2006-90354 | 4/2006 |
| JP | 2006-208038(A) | 8/2006 |
| JP | 2007-162831 | 6/2007 |

OTHER PUBLICATIONS

European Search Report dated Jun. 3, 2009.
Japanese Office Action dated Oct. 24, 2011 with an English translation thereof.

* cited by examiner

ROLLING BEARING DEVICE

BACKGROUND OF THE INVENTION

This invention relates to a rolling bearing device used for a wheel supporting structure of a vehicle.

There is a previously known wheel supporting device in a vehicle in a structure having a drive shaft rotating integrally with a wheel, the drive shaft connected with a hub for mounting the wheel and the hub rotatably supported by a knuckle through a bearing (see JP-A-2000-71710).

Further, in the bearing used in such a wheel supporting device, muddy water will invade between its inner ring and outer ring. Thus, there is a known bearing device which prevents invasion of the muddy water by a sealing device provided between the inner and outer rings (see JP-A-2006-208038).

However, in this bearing supporting device, as shown in FIG. 10, the muddy water will invade the sealing device C1 side of a bearing C from the clearance D located between an outer peripheral surface A1 of a drive shaft A and a mounting opening B1 for inserting the bearing C in a knuckle B. During traveling, the muddy water will vigorously invade the sealing device C1 side so that as the case may be, with only this sealing device C1, invasion of the muddy water cannot be prevented. In order to prevent such invasion of the muddy water, it is known that a deflector E having a labyrinth function is provided between the outer peripheral surface A1 of the drive shaft A and the mounting opening B1 of the knuckle B. In this structure, in order to press-fit the deflector E onto the outer peripheral surface A1 of the drive shaft A, the outer peripheral surface A1 must be subjected to cutting. On the other hand, as to the inner peripheral surface B2 of the mounting opening B1 of the knuckle B, a clearance F has to be formed to give the labyrinth function between the inner peripheral surface B2 and the outer side E1 of the deflector E so that the inner peripheral surface B2 has to be also subjected to cutting. In addition, these cuttings require gauging process owing to changes in the tolerances of the respective components.

SUMMARY OF THE INVENTION

An object of this invention is to provide a rolling bearing device in which a sealing member arranged in the clearance between a drive shaft and a knuckle is mounted on the side of a bearing thereby to make gauging process for the drive shaft and knuckle unnecessary and improve a muddy water invasion preventing function for the bearing side.

In order to solve the above problem, this invention provides a rolling bearing device a rolling bearing provided with an outer ring connected to a mounting opening of a knuckle on a vehicle inner side, an inner ring connected to a wheel on a vehicle outer side through a hub, a rolling element intervening between the outer ring and the inner ring and a sealing device for sealing the space between the inner and outer rings from the outside, comprising: a sealing member for limiting the foreign substance invading the rolling bearing side from a clearance existing between a drive shaft provided rotatably with the inner ring and the knuckle, the sealing member being formed in a composite structure consisting of a ring-shaped sealing body of an elastic material and a ring-shaped cover integrated to the sealing body, the cover including a cylinder press-fit in the outer peripheral surface or inner peripheral surface of the outer ring and a ring-shaped upstanding wall coupled with the cylinder, the sealing body being integrated at the ring-shaped upstanding wall and provided with an outer lip serving to show the sealing function in cooperation with the outer peripheral surface of the drive shaft or the inner ring.

In accordance with the above configuration, since the cover mounted in the rolling bearing is provided with the outer lip showing the sealing function, gauging process for the drive shaft and knuckle can be made unnecessary. The muddy water having dynamic pressure invading from between the drive shaft and knuckle can be also sealed by the outer lip so that load for the sealing device of the rolling bearing can be reduced. In addition, since the sealing device has a double sealing function, its sealing function itself can be improved.

If the cylinder of the cover, press-fit in the outer peripheral surface of the outer ring is provided with a spring constantly pressing the outer peripheral surface of the outer ring, the cover after fit in the rolling bearing can be prevented from coming off.

If a diameter-reducing level plane is formed on the outer peripheral surface of the outer ring connected to the mounting opening of the knuckle not so as to project the outer diameter surface of the cylinder more greatly than the outer peripheral surface of the outer ring, the outer peripheral surface of the outer ring of the rolling bearing can be employed as a reference in mounting at the mounting opening of the knuckle. Thus, the mounting accuracy of the rolling bearing in the knuckle can be improved.

Further, in place of the sealing body at the ring-shaped upstanding wall, a skirt showing a labyrinth function in cooperation with the outer peripheral surface of the drive shaft may be extended to the vehicle inner side from the ring-shaped upstanding wall. In this case, since the skirt has a sealing function in a non-contact manner, load is not applied at the area where the cylinder of the cover is press-fit so that fitting endurance of the cover can be improved.

Further, this invention also provides a rolling bearing device having a rolling bearing provided with an outer ring connected to a mounting opening of a knuckle on a vehicle inner side, an inner ring connected to a wheel on a vehicle outer side through a hub, a rolling element intervening between the outer ring and the inner ring and a sealing device for sealing the space between the inner and outer rings from the outside, wherein the sealing device consisting of an outer case fit in the inner peripheral surface of the outer ring and an inner case fit in the outer peripheral surface of the inner ring, the outer case is provided with a sealing piece of an elastic material showing a sealing function in cooperation with the inner case, and the inner case is provided with an outer lip of the elastic material showing the sealing function in cooperation with the outer peripheral surface of the drive shaft.

In accordance with this configuration, since the sealing device mounted in the rolling bearing is further provided with the outer lip, gauging process for the drive shaft and knuckle can be made unnecessary. The muddy water having dynamic pressure invading from between the drive shaft and knuckle can be also sealed by the outer lip so that load for the sealing device of the rolling bearing can be reduced. In addition, since the sealing device has a double sealing function, its sealing function itself can be improved.

Further, in place of the outer lip of the inner case, a skirt showing a labyrinth function in cooperation with the outer peripheral surface of the drive shaft may be extended to the vehicle inner side from the inner case. In this case, since the skirt has a sealing function in a non-contact manner, load is not applied at the area where the cylinder of the cover is press-fit so that fitting endurance of the cover can be improved.

DETAILED DESCRIPTION OF PREFERRED EMBODIMENTS

Figure 1:
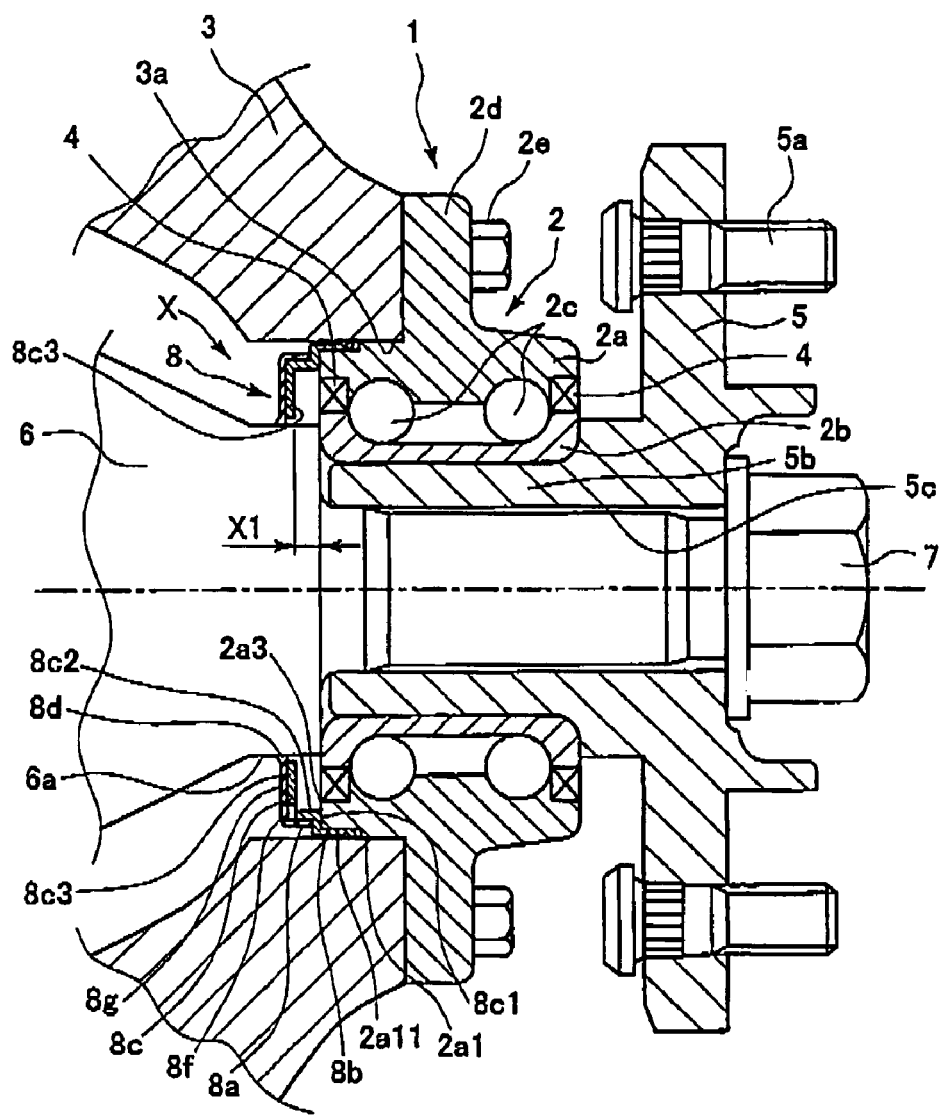
FIG. 1 is a sectional view of a wheel supporting structure with a rolling bearing device according to this invention.

Hereinbelow, an explanation will be given of embodiments of this invention with reference to examples illustrated in the drawings. FIG. 1 is a sectional view of an example of a rolling bearing device according to this invention. Referring to FIG. 1, a rolling bearing device 1 includes a rolling bearing 2 having an outer ring $2a$, an inner ring $2b$ and rolling elements $2c$ which are balls arranged in plural rows between the inner ring $2b$ and the outer ring $2a$.

The rolling bearing 2 is connected to a mounting opening $3a$ of a knuckle 3 serving as a vehicle fixing member on a vehicle inner side. More specifically, the one side of the vehicle inner side in the outer ring $2a$ of the rolling bearing 2 is inserted and fitted into the mounting opening $3a$ and the flange $2d$ formed on the vehicle outer side in the outer ring $2a$ is fixed to the peripheral surface (vehicle outer side) of the mounting opening $3a$ of a knuckle 3 through a connecting member $2e$ such as a bolt/nut.

Figure 2:
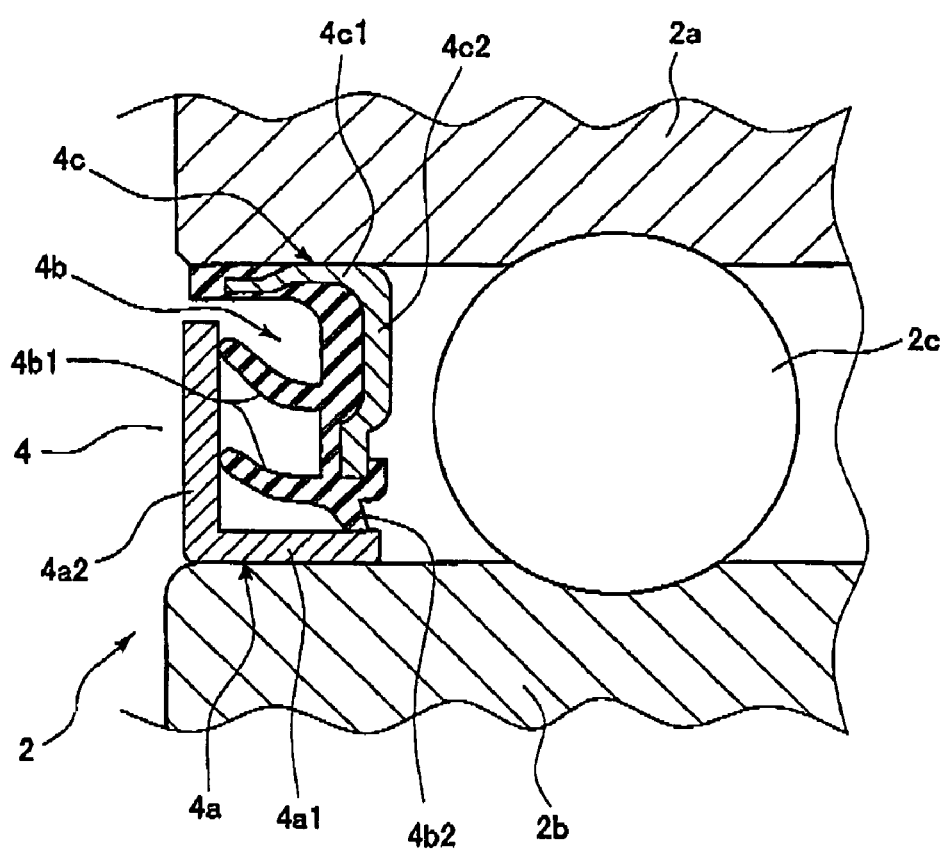
FIG. 2 is a partial sectional view of a sealing device of the rolling bearing device.

The rolling bearing 2 is provided with a sealing device 4 for sealing the clearance between the inner ring $2b$ and the outer ring $2a$ from the outside. The sealing device 4, as shown in FIG. 2, includes a ring-shaped inner case $4a$ fit over the inner ring $2b$ and a ring-shaped outer case $4c$ fit in the outer ring $2a$ in a state integrated with a ring-shaped sealing member $4b$.

The inner case $4a$ is formed of a sectional L-shaped metallic plate and includes a first cylinder $4a1$ fit over the inner ring $2b$ and a first wall $4a2$ bent from its end and extended in a direction of the outside diameter.

The outer case $4c$ is formed of a sectional L-shaped metallic plate and includes a second cylinder $4c1$ fit in the outer ring $2a$ and a second wall $4c2$ bent from its end and extended in a direction of the inside diameter.

Further, the sealing member $4b$ integrated to the outer case $4c$ is made of an elastic material such as cured rubber. The integrated sealing member $4b$ includes an axial lip $4b1$ whose tip is in sliding-contact with the first wall $4a2$ of the inner case of the inner case $4a$ and a radial lip $4b2$ whose tip is in sliding-contact with the first cylinder $4a1$ of the inner case $4a$. The inner case $4a$ and sealing member $4b$ cooperate with each other to show the sealing function in a contact manner.

Returning to FIG. 1, the inner ring $2b$ of the rolling bearing 2 is connected with a hub 5. The hub 5 has a hub bolt $5a$ for mounting a wheel (not shown) on the vehicle outer side. On the vehicle inner side, the hub 5 has a press-fitting axis $5b$ press-fit in the inner ring $2b$ of the rolling bearing 2. The press-fitting axis $5b$ is press-fit in the inner ring $2b$ so that the hub 5 is rotatable with the inner ring $2b$.

The hub 5 is spline-connected to the drive shaft 6 and fixed by passing the one end of the drive shaft 6 through a passing-thorough hole $5c$ formed in the press-fitting axis $5b$ of the hub 5 and screwing a nut 7 with this end.

Further, the rolling bearing 2 is provided with a sealing member 8 for limiting the an foreign substance such as muddy water and dust which will invade the sealing device 4 side of the rolling bearing 2 from a ring-shaped clearance X existing between the drive shaft 6 provided rotatably with the inner ring $2b$ and the knuckle 3.

The sealing member 8 has a composite structure including a ring-shaped sealing body $8g$ in contact with the drive shaft 6 and a ring-shaped cover $8a$. The cover $8a$ includes a cylinder $8b$ press-fit in the outer peripheral surface $2a1$ of the outer ring $2a$ and a ring-shaped upstanding wall $8c$ bent from the end of the cylinder $8b$ and continuously extended in a direction of the inside diameter. An outer lip $8d$ which is made of an elastic material which cooperates with the outer peripheral surface $6a$ of the drive shaft 6 to show the sealing function in a contact manner is provided at the inside diameter end of the ring-shaped upstanding wall $8c$ of the cover $8a$ and is a part of the sealing body $8g$.

The ring-shaped upstanding wall $8c$, on its base side continuous to the cylinder $8b$, has an abutting surface $8c1$ abutting onto the end surface $2a3$ of the outer ring $2a$. Further, the ring-shaped upstanding wall $8c$ has a continuous cylinder $8c2$ bent from the abutting surface $8c1$ to continue to the vehicle inner side and a continuous wall $8c3$ bent from the continuous cylinder $8c2$ and continuously extended in a direction of the inside diameter. These continuous cylinder $8c2$ and continuous wall $8c3$ are made of a metallic plate. The outer lip $8d$ provided at the inside diameter end of the ring-shaped upstanding wall $8c$ thus formed is formed by projecting, from this position in a direction of the inside diameter, a part of the sealing body $8g$ integrated to the cover $8a$ by curing/bonding the elastic material such as rubber.

The cylinder $8b$ of the cover $8a$ is press-fit in the outer peripheral surface $2a1$ of the outer ring $2a$ of the rolling bearing 2 and the abutting surface $8c1$ is abutted onto the end surface $2a3$ so that the cover $8a$ is positioned. Further, since a clearance X1 is formed between the continuous wall $8c3$ of the cover $8a$ and the end of the rolling bearing 2, even if the foreign substance is mixed in, its piling is suppressed, thereby improving the reliability for a long time use. Further, at the lower position when the rolling bearing device 1 is assembled with the vehicle, the cover $8a$ has a drain hole $8f$ for discharging the foreign substance invaded the clearance X1.

Further, a small-diameter step plane $2a11$ is formed at a part of the outer peripheral surface $2a1$ of the outer ring $2a$ where the cylinder $8b$ of the cover $8a$ is press-fit. The small-diameter step plane 2a11 has a smaller diameter than the outer diameter of the outer peripheral surface 2a1 and does not project the outer diameter surface 8b1 of the cylinder 8b more greatly than the outer peripheral surface 2a1 of the outer ring 2a. Even if the cylinder 8b is press-fit in the small-diameter step plane 2a11, the reference plane (outer peripheral surface 2a1) when the rolling bearing 2 is mounted in the mounting opening 3a of the knuckle 3 is maintained.

Figure 3:
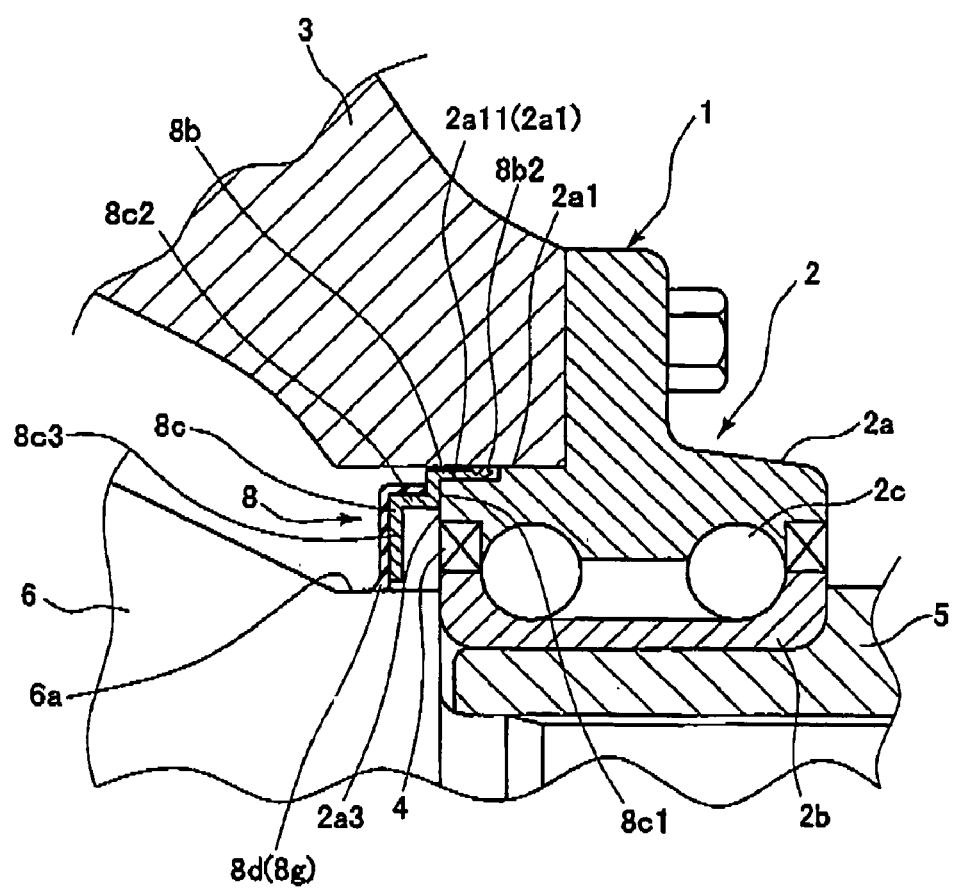
FIG. 3 is a partial sectional view of a cover of the rolling bearing device.

Further, as shown in FIG. 3, the cylinder 8b press-fit in the small-diameter step plane 2a11 (outer peripheral surface 2a1) of the outer ring 2a has a plurality of springs 8b2 for constantly pressing the outer peripheral surface 2a1 of the outer ring 2a, provided at regular intervals in a circumferential direction. These springs 8b2 are formed not so as to project from the outer peripheral surface 2a1 of the outer ring 2a. These springs 8b2 serves to prevent the cover 8a from coming off.

Figure 4:
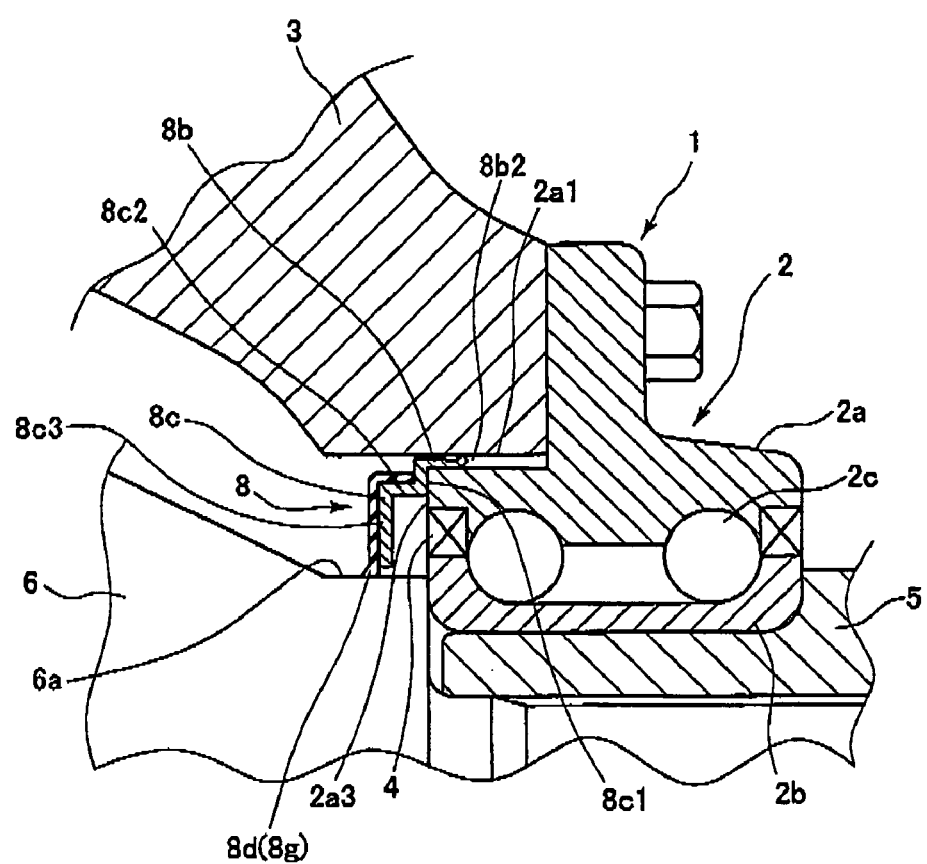
FIG. 4 is a partial sectional view of another embodiment of the cover.

Further, as shown in FIG. 4, without providing the small-diameter step plane 2a11 on the outer peripheral surface 2a1 of the outer ring 2a, the cylinder 8b of the cover 8a can be also directly press-fit in the outer peripheral surface 2a1. As to the other components in this example, by applying the same reference numerals to components same as the components in the above other embodiment, their detailed explanation will not be given.

Figure 5:
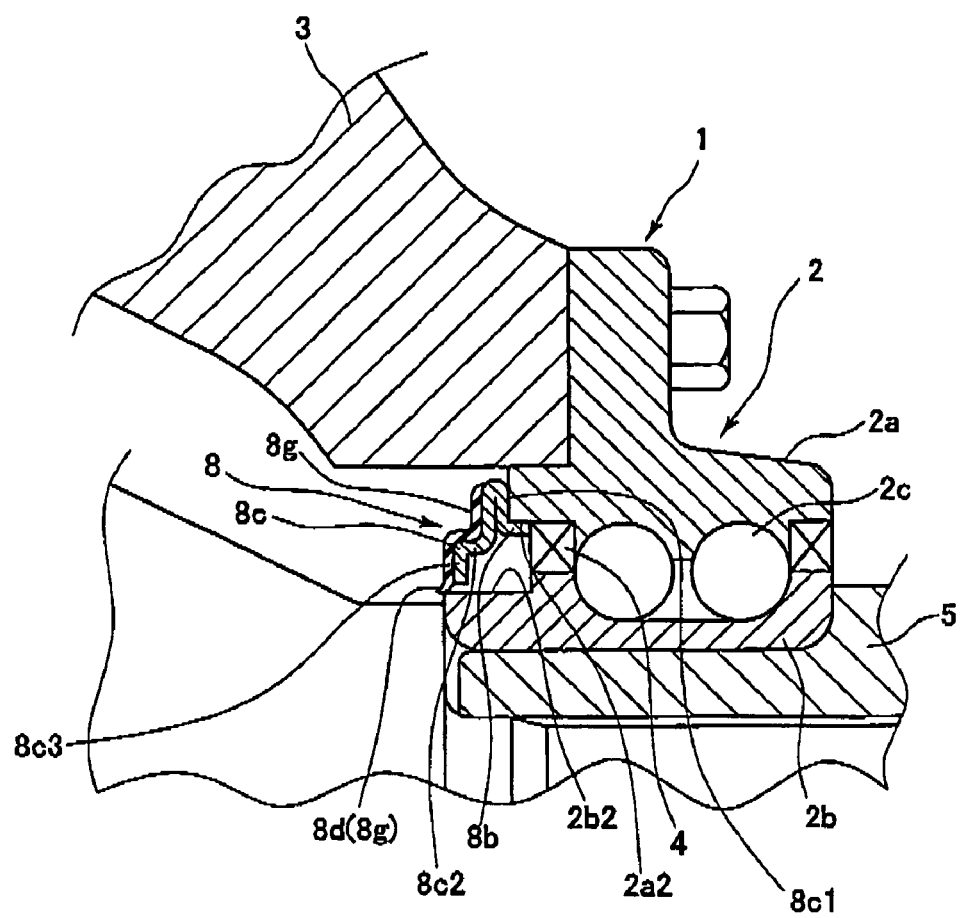
FIG. 5 is a partial sectional view of another embodiment of the cover.

Further, as shown in FIG. 5, the cylinder 8b of the cover 8a can be formed to be press-fit in the inner peripheral surface 2a2 of the outer ring 2a. Further, as to an area where the sealing function in cooperation with the outer lip 8d is realized, when the inner ring 2b of the rolling bearing 2 is projected toward the vehicle inner side more greatly than the outer ring 2a, the inner peripheral surface 2b2 of the inner ring 2b can be brought into contact with the outer lip 8d. As to the other components in this example, by applying the same reference numerals to components same as the components in the above other embodiment, their detailed explanation will not be given.

Figure 6:
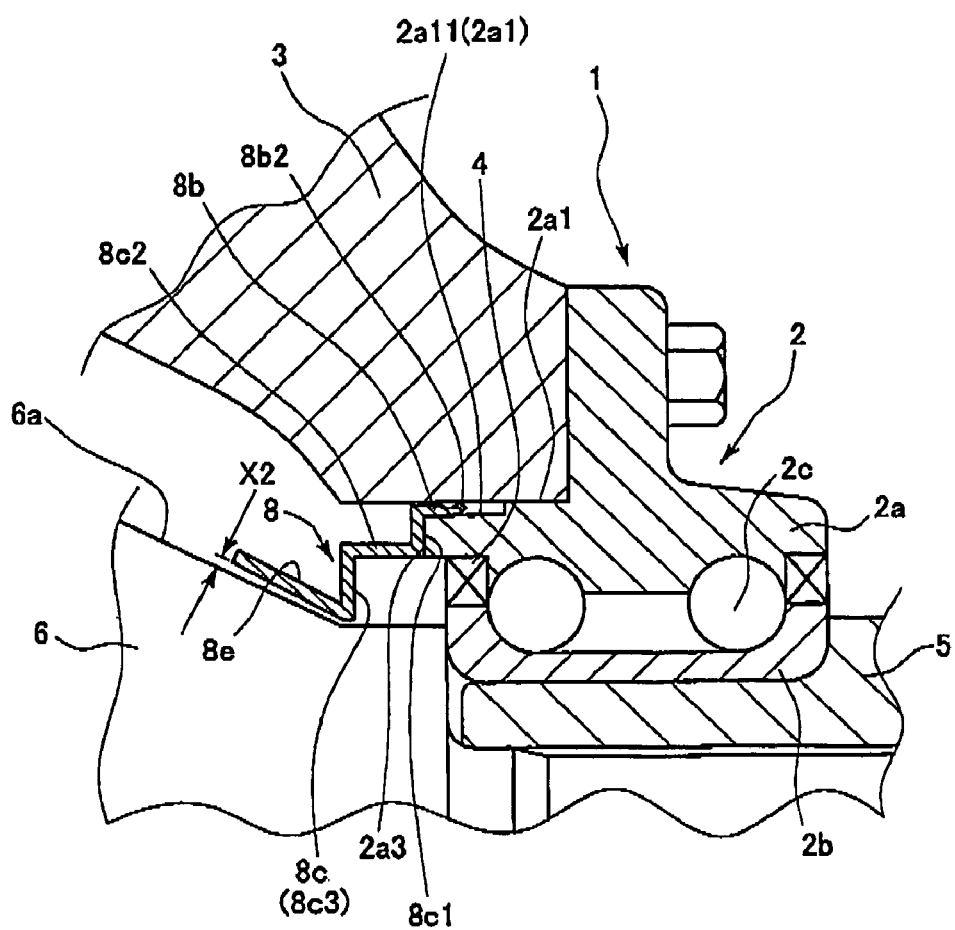
FIG. 6 is a partial sectional view of another embodiment of the cover.

FIG. 6 is a sectional view of the cover 8a of the sealing member 8 according to another embodiment. In FIG. 6, in place of the outer lip 8d at the inside diameter end of the sealing member 8, a skirt 8e is extended toward the vehicle inner side, which cooperates with the outer peripheral surface 6a of the drive shaft 6 to show the labyrinth function in a non-contact manner.

The outer peripheral surface 6a of the drive shaft 6 may be formed in any optional shape. For example, if it is circular or tapered, the skirt 8e is formed cylindrically or tapered-cylindrically along the outer peripheral surface 6a of the drive shaft 6. Further, between the skirt 8e and the outer peripheral surface 6a of the drive shaft 6, a predetermined clearance X2 is formed to show the labyrinth sealing function. In the case of the skirt 8e formed in the tapered shape, the clearance X2 is set so that it increases gradually from the vehicle outer side (right in the drawing) to the vehicle inner side (left in the drawing). As to the other components in this example, by applying the same reference numerals to components same as the components in the above other embodiment, their detailed explanation will not be given.

Figure 7:
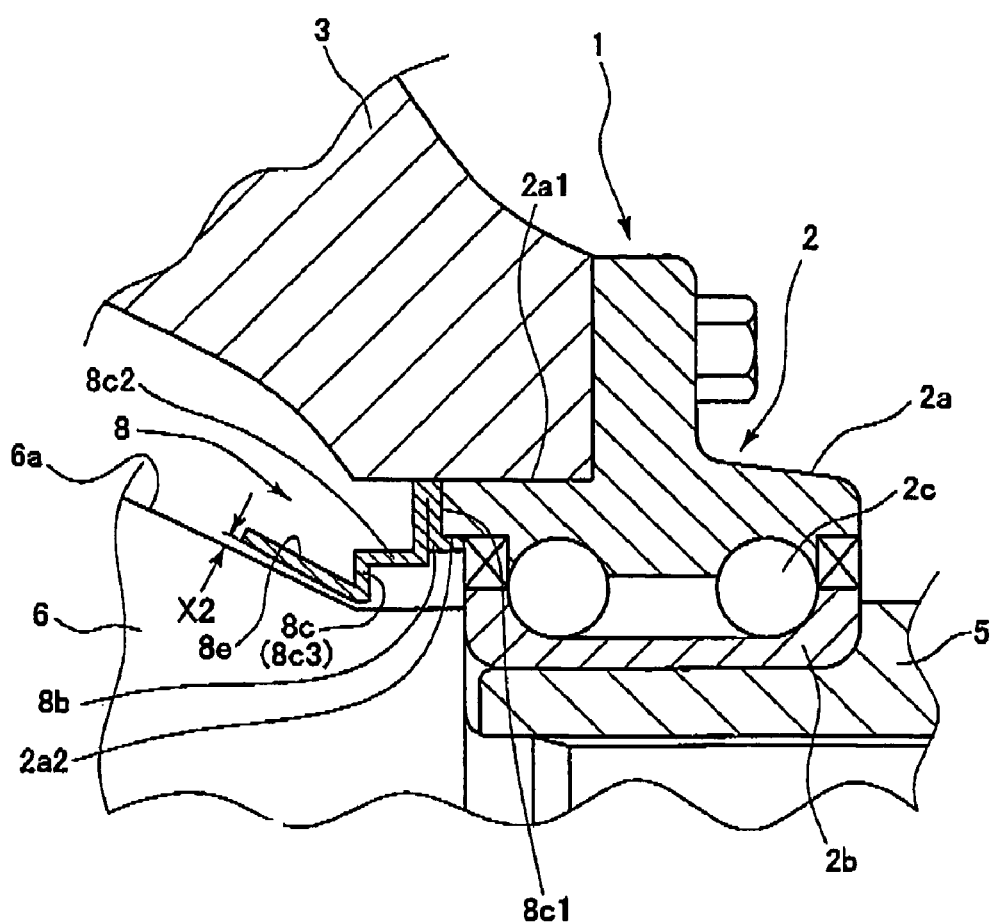
FIG. 7 is a partial sectional view of another embodiment of the cover.

Further, as shown in FIG. 7, the cylinder 8b of the cover 8a having the skirt 8e can be formed to be press-fit in the inner peripheral surface 2a2 of the outer ring 2a. As to the other components in this example, by applying the same reference numerals to components same as in the components in the above other embodiment, their detailed explanation will not be given.

As understood from the description, in the rolling bearing device 1 in which the cover 8a is externally attached to the rolling bearing 2 to have a double sealing function, the outer lip 8d having a sealing function in a contact manner of the cover 8a and the skirt 8e having the labyrinth function in a non-contact manner can prevent invasion of the muddy water flowing toward the rolling bearing 2 side from the clearance X on the vehicle inner side in the mounting opening 3a of the knuckle 3 during traveling.

Figure 8:
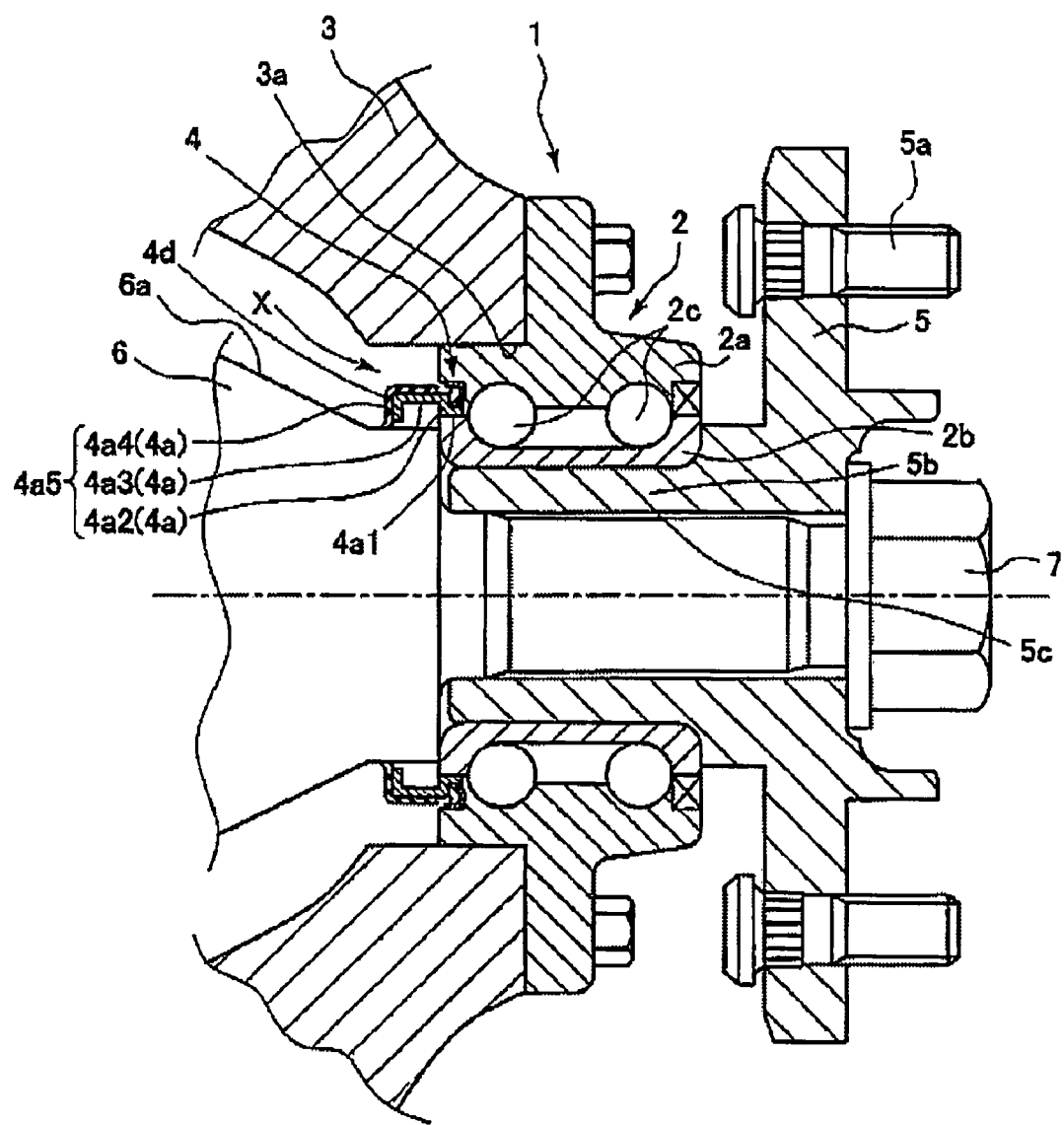
FIG. 8 is a partial sectional view of another embodiment of the sealing device of the rolling bearing device.

FIG. 8 is a sectional view of the main part of another embodiment of the sealing device 4. In FIG. 8, in this example, the sealing device 4 is provided with a sectional U-shape outer seal 4a5 including a first wall 4a2 of a ring-shaped inner case 4a fit over the inner ring 2b, a third cylinder 4a3 bent from the end of the first wall 4a2 and extended toward the vehicle inner side and a third wall 4a4 bent from the end of the third cylinder 4a3 and extended to the drive shaft 6 side.

The outer seal 4a5 includes an outer lip 4d of an elastic material which cooperates with the outer peripheral surface 6a of the drive shaft 6 to show the sealing function. The outer lip 4d is formed by projecting a part integrated to the outer seal 4a5 by curing/bonding the elastic material such as rubber toward the drive shaft 6. As to the other components in this example, referring like reference numerals to like components in the above other embodiment, their detailed explanation will not be given.

Figure 9:
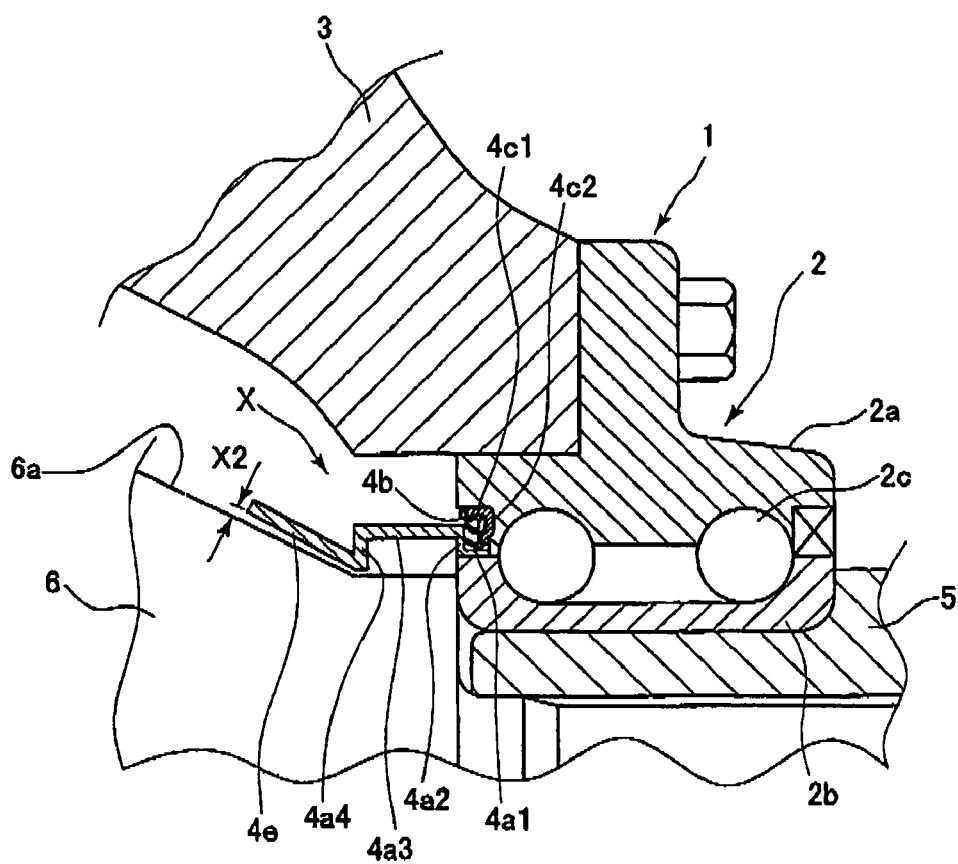
FIG. 9 is a partial sectional view of another embodiment of the sealing device.
Figure 10:
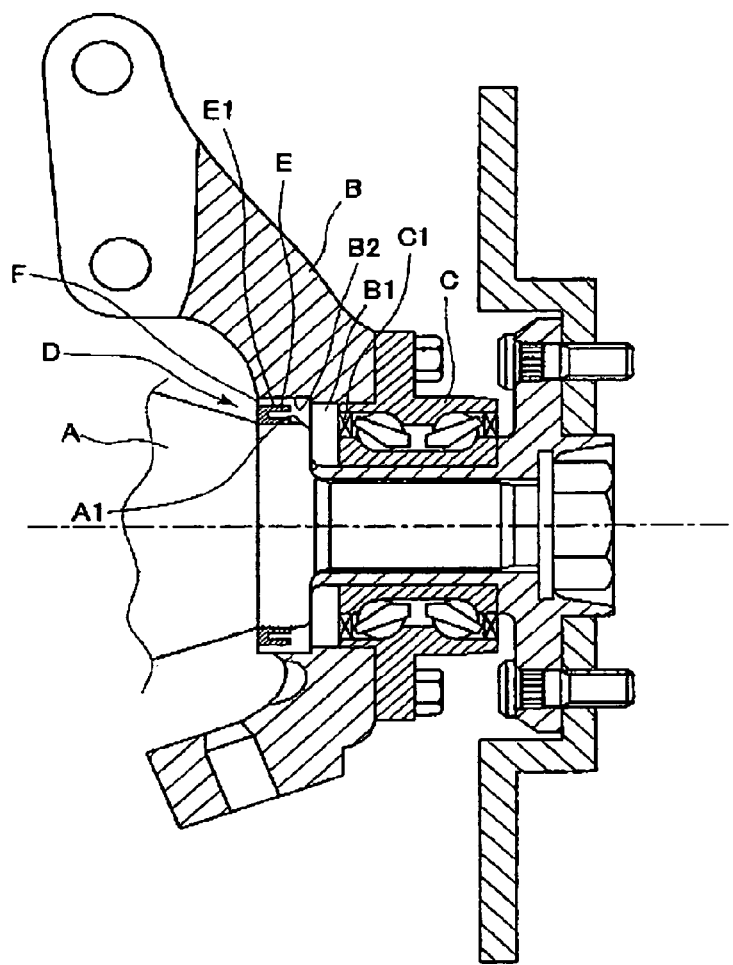
FIG. 10 is a sectional view of a wheel supporting structure according to a prior art.

Further, as shown in FIG. 9, in place of the outer lip 4d of the sealing device 4, a skirt 4e is extended toward the vehicle inner side, which cooperates with the outer peripheral surface 6a of the drive-shaft 6 to show the labyrinth function in a non-contact manner. The outer peripheral surface 6a of the drive shaft 6 may be formed in any optional shape. For example, if it is circular or tapered, the skirt 4e is formed cylindrically or tapered-cylindrically along the outer peripheral surface 6a of the drive shaft 6.

A predetermined clearance X2 is formed between the skirt 4e and the outer peripheral surface 6a of the drive shaft 6 to show the labyrinth sealing function. In the case of the skirt 4e formed in the tapered shape, the clearance X2 is set so that it increases gradually from the vehicle outer side (right in the drawing) to the vehicle inner side (left in the drawing). As to the other components in these examples, by applying the same reference numerals to components same as the components in the above other embodiment, their detailed explanation will not be given.

As understood from the description, in the rolling bearing device 1 with the sealing device 4 having the double sealing function, the outer lip 4d having a sealing function in a contact manner and skirt 4e having the labyrinth function in a non-contact manner can prevent invasion of the muddy water flowing toward the rolling bearing 2 side from the clearance X on the vehicle inner side in the mounting opening 3a of the knuckle 3 during traveling.

Next, with reference to examples illustrated in the drawings, an explanation will be given of an embodiment of a sensor-equipped rolling bearing device 11 to which the sealing member 8 in the rolling bearing according to this invention is applicable. As to the other components in these examples, by applying the same reference numerals to components same as the components in the above other embodiment, their detailed explanation will not be given. Additionally, in place of the skirt 8e in the sealing member 8, as described above, the outer lip 8d in the contact manner can be provided.

Figure 11:
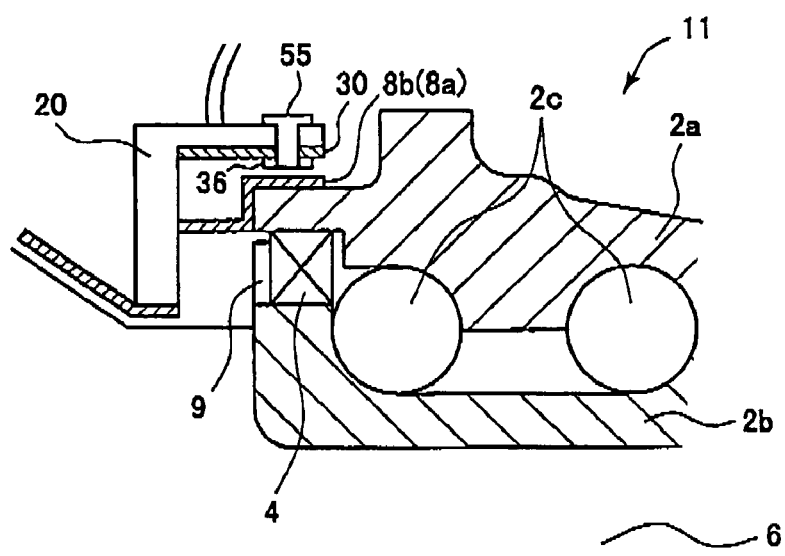
FIG. 11 is an axial-direction sectional view of a sensor-equipped rolling bearing device with a sealing member.
Figure 11:
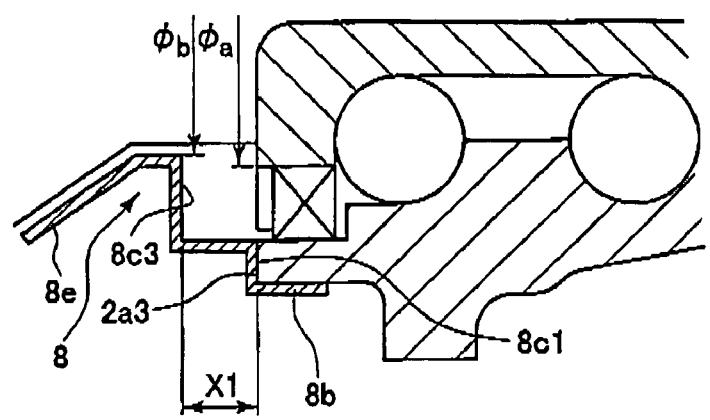

FIG. 11 is a sectional view in an axial direction of a sensor-equipped rolling bearing device 11. In FIG. 11, on the vehicle inner side of the sealing device 4 arranged on the vehicle inner side of the sensor-equipped rolling bearing device 11, a magnet rotor 9 (magnetic material) of a permanent magnet is fit in the inner ring 2b. The magnet rotor 9 has a structure having N-poles and S-poles arranged alternately in a circumferential direction. Its magnetic flux density is changed by the rotation of the drive shaft 6 and inner ring 2b so that an ABS sensor 20 detects the change to measure the rotating speed.

The ABS sensor 20 is mounted in the cover 8a of the sealing member 8. The cover 8a is provided with a fixing member 30 for fixing the ABS sensor 20.

Figure 12:
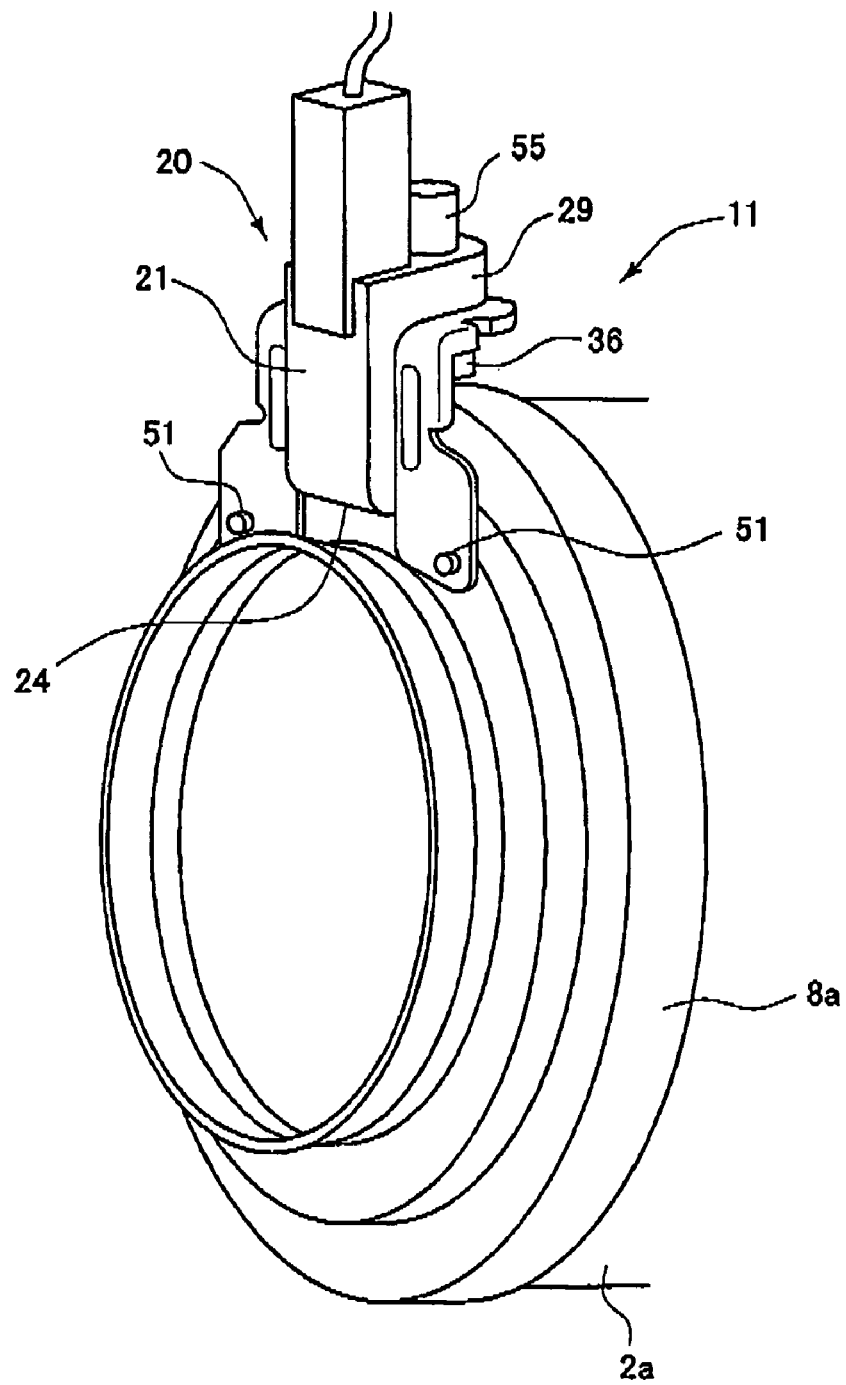
FIG. 12 is a perspective view of a sensor-equipped rolling bearing device.
Figure 13:
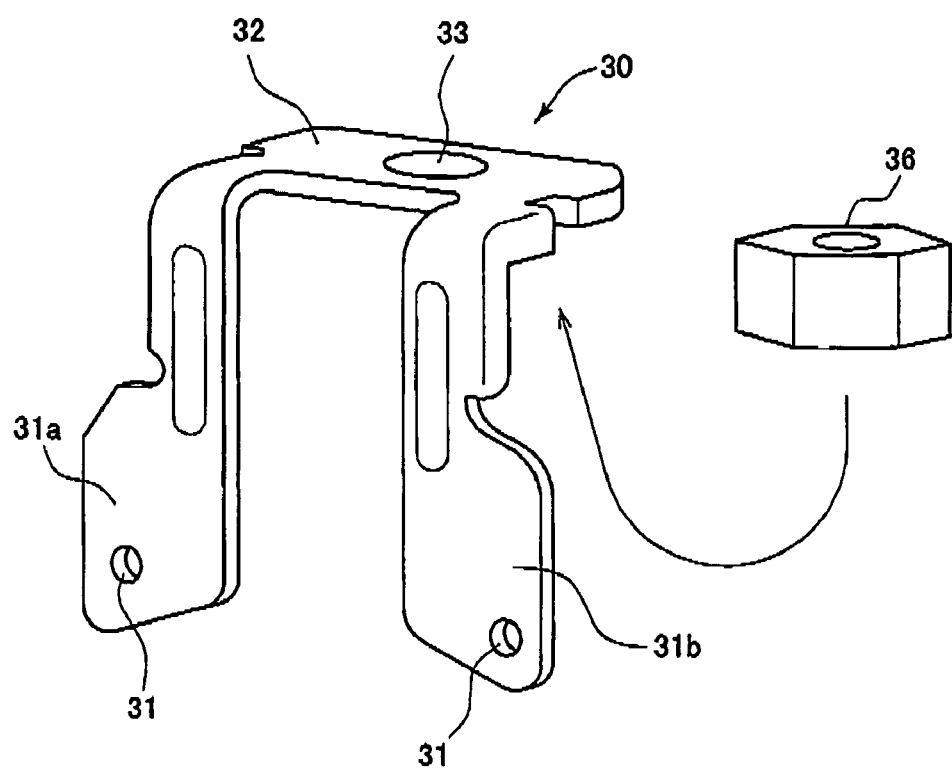
FIG. 13 is a view of a fixing member.
Figure 14:
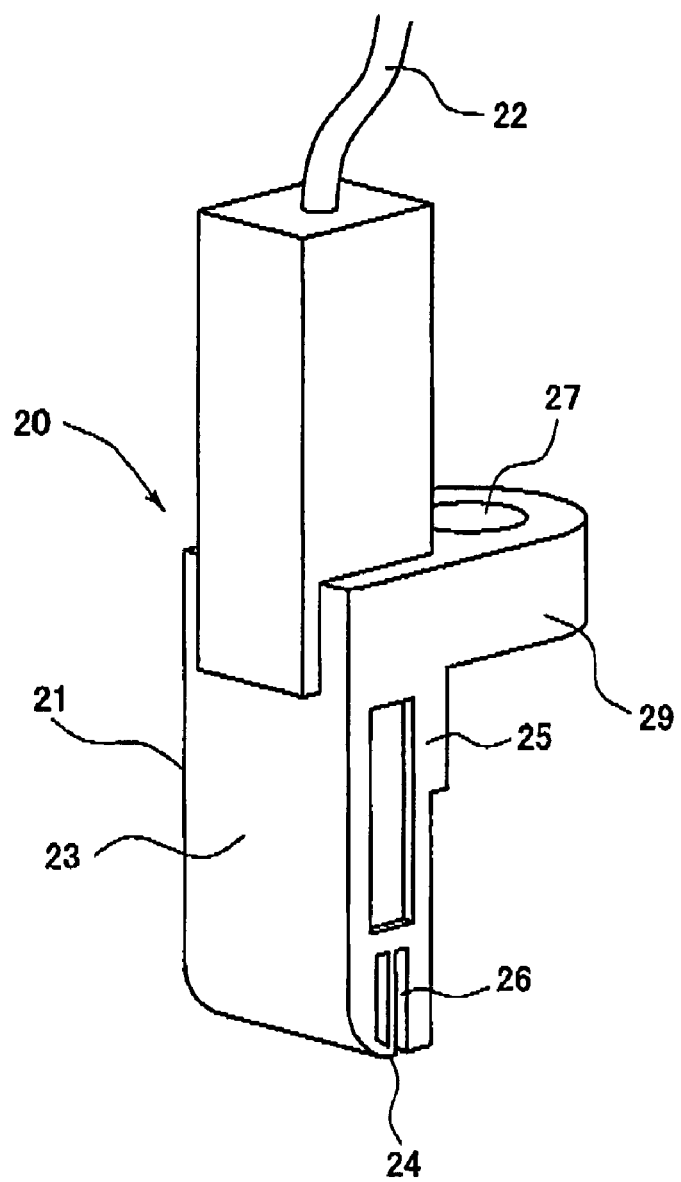
FIG. 14 is a view showing an ABS sensor.
Figure 15:
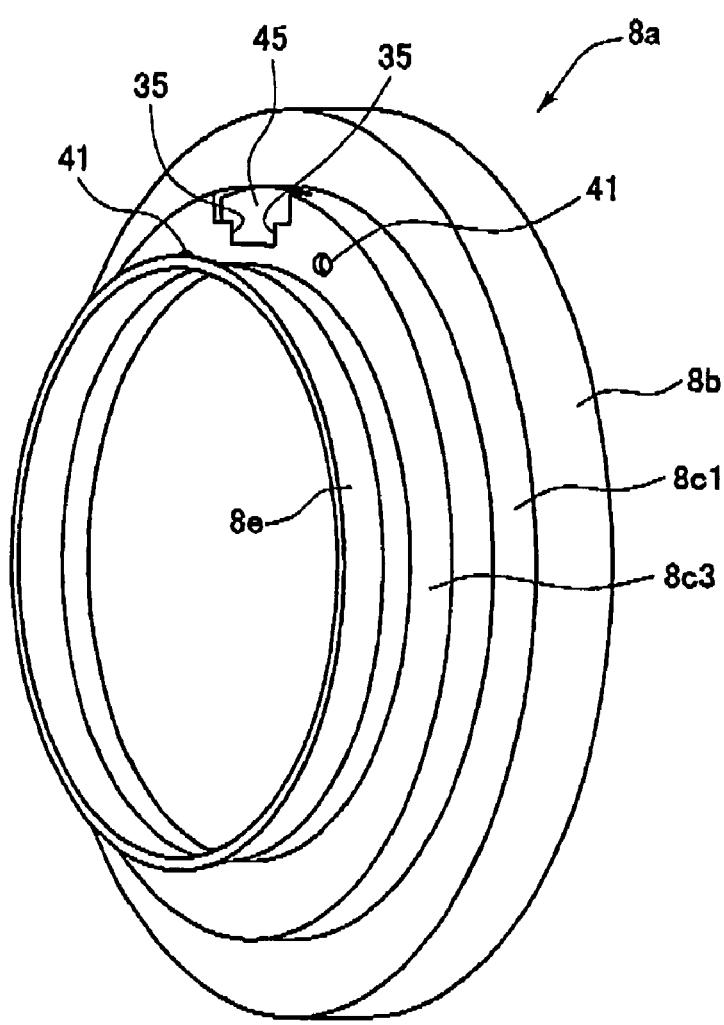
FIG. 15 is a perspective view of the cover.

FIG. 12 is a perspective view of the cover 8a in which the ABS sensor 20 is mounted. FIG. 13 is a view showing only the fixing member 30. FIG. 14 is a view showing only the ABS sensor 20. FIG. 15 is a view showing only the cover 8a. The fixing member 30 shown in FIG. 13 has a seat surface 32 on which the ABS sensor 20 is placed and a hole 33 formed in the seat surface 32. A nut 36 is welded on the inner side in the radial direction of the hole 33.

Further, a pair of left and right stays 31a, 31b are continuously bent from both sides of the seat surface 32. A body 21 of the ABS sensor 20 is inserted between the stays 31a and 31b. The stay 31a, 31b has a hole 31 for fixing the fixing member 30 to the cover 8a.

The ABS sensor 20 shown in FIG. 14 mainly includes the body 21 and a signal line 22. The body 21 is provided with a detector for detecting the magnetic flux of the magnet rotor 9. The signal carrying a measured value is sent through the signal line 22 to an ECU mounted in the vehicle.

The surface of the body 21 includes a tip 24, an upper surface 23 and a side surface 25. The body 21 is formed in a pillar shape with a square in section. The body 21 has another side surface which is located on the rear side opposite to the side surface 25, not shown in FIG. 14. The body 21 has a projection 29 with a through-hole 27. The ABS sensor 20, as shown in FIG. 12, is fixed to the fixing member 30 with its tip 24 being oriented inwardly in the radial direction and the projection 29 being oriented inwardly in the axial direction (direction toward the inside of the bearing).

As shown in FIG. 14, the side surface 25 has a rail groove 26 extending from the intermediate position to the tip 24. The rail groove 26 is formed in the same shape on each of both sides.

As shown in FIG. 11, the continuous wall 8c3 of the cover 8a is employed as an area covering the magnet rotor 9. The continuous wall 8c3 covers the magnet rotor 9 in the circumferential direction with a clearance therefrom. The inner diameter φb of the continuous wall 8c3 is made equal to or smaller than the inner diameter φa of the magnet rotor 9. Thus, the continuous wall 8c3 restrains the magnet rotor 9 from being exposed to the outside.

The foreign substance is restrained from being mixed from the outside and deposited to the magnet rotor 9. Further, since the clearance X1 is formed between the magnet rotor 9 and the continuous wall 8c3, even if the foreign substance is mixed, piling thereof between the magnet rotor 9 and the continuous wall 8c3 is restrained, thereby improving reliability of the magnet rotor 9 for its long time use.

Further, as shown in FIG. 15, the cover 8a has a hole 41. The hole 41 is employed to fix the fixing member 30 to the cover 8a. The cover 8a has also a sensor hole 45. On both sides of the sensor hole 45, rails 35 are formed which are fit in the rail grooves 26 of the body 21 of the ABS sensor 20. The ABS sensor 20 is fixed at the position of the sensor hole 45 so that the measuring portion of the ABS sensor 20 directly surfaces the magnet rotor 9 thereby to permit the measurement of the magnetic flux thereof.

The ABS sensor 20 is integrated to the fixing member 30 in such a manner that the rail grooves 26 and rails 35 are fit to each other. Further, as shown in FIG. 12, the hole 33 with a nut 36 welded on the rear side and the through-hole 27 are connected by a bolt 55 so that the ABS sensor 20 is fixed to the fixing member 30. Further, the through-hole 31 formed in the fixing member and the hole 41 formed in the cover 8a are connected by a bolt 51 so that the fixing member 30 is fixed to the cover 8a.

In the above embodiment, the hole 33, 31 may not have a tap. The nut 36 may not be welded. For the hole 33, 31, bolting was adopted but another technique such as riveting may be adopted. In the case of riveting, the number of components can be reduced as compared with the case of using the bolt and nut.

Figure 16:
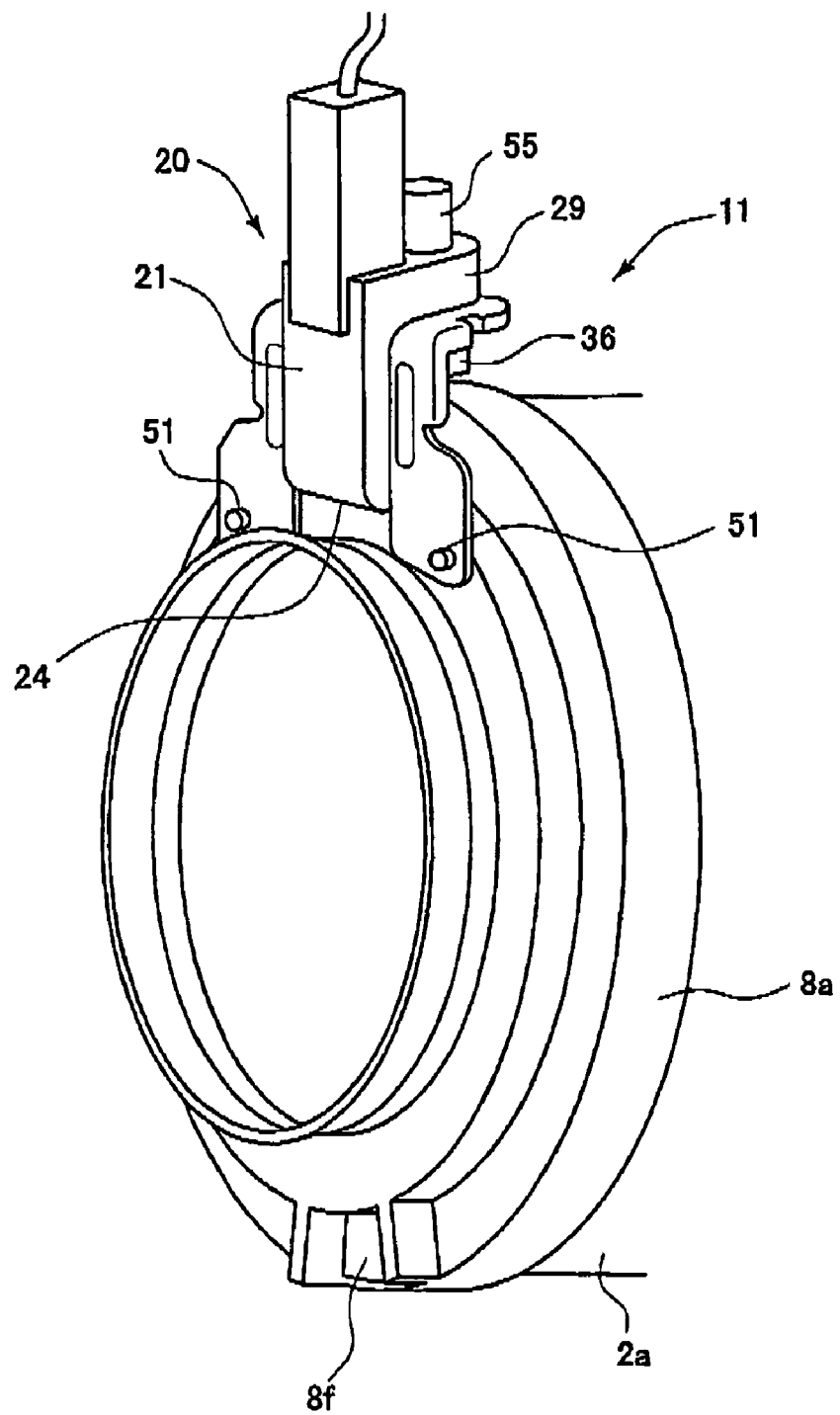
FIG. 16 is a perspective view of another embodiment of the sensor-equipped rolling bearing device.
Figure 17:
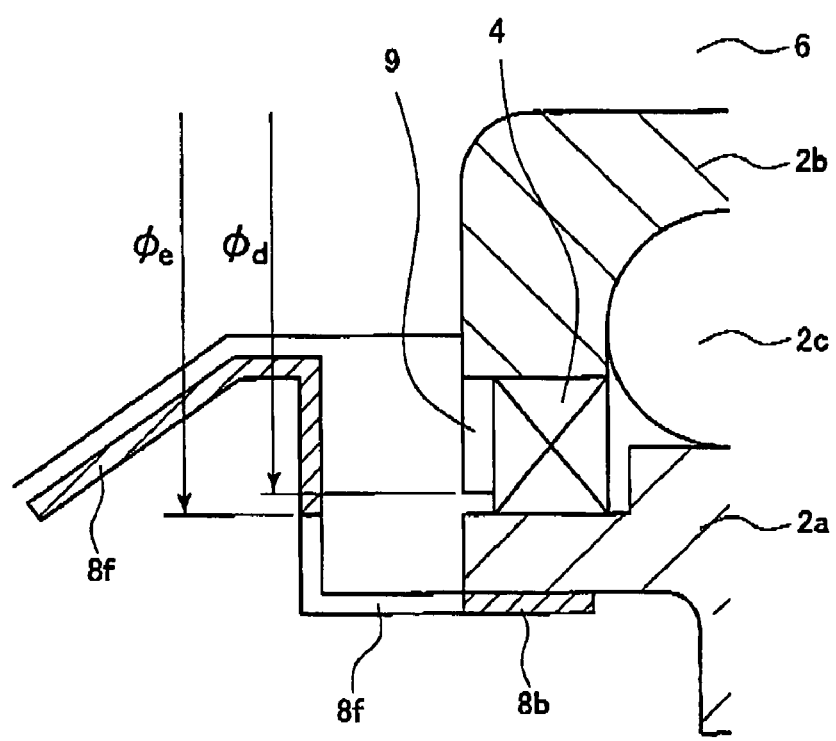
FIG. 17 is an axial-direction sectional view of another embodiment of the sensor-equipped rolling bearing device.

FIGS. 16 and 17 show an example in another embodiment. In a sensor-equipped rolling bearing device 11 in this example, a drain hole 8f for drainage is formed at the lower part of the cover 8a as shown. It can be assumed that the lower part shown in FIGS. 16 and 17 corresponds to that in the state actually installed. The drain hole 8f can externally discharge the muddy water internally invaded.

The inner diameter φe of the drain hole 8f is made equal to or larger than the outer diameter φd of the magnet rotor 9. Thus, the provision of the drain hole 8f restrains the magnet rotor 9 from being externally exposed. Thus, the foreign substance is restrained from being mixed through the drain hole 8f from the outside and deposited to the magnet rotor 9, thereby improving reliability of the magnet rotor 9 for its long time use.

Figure 18:
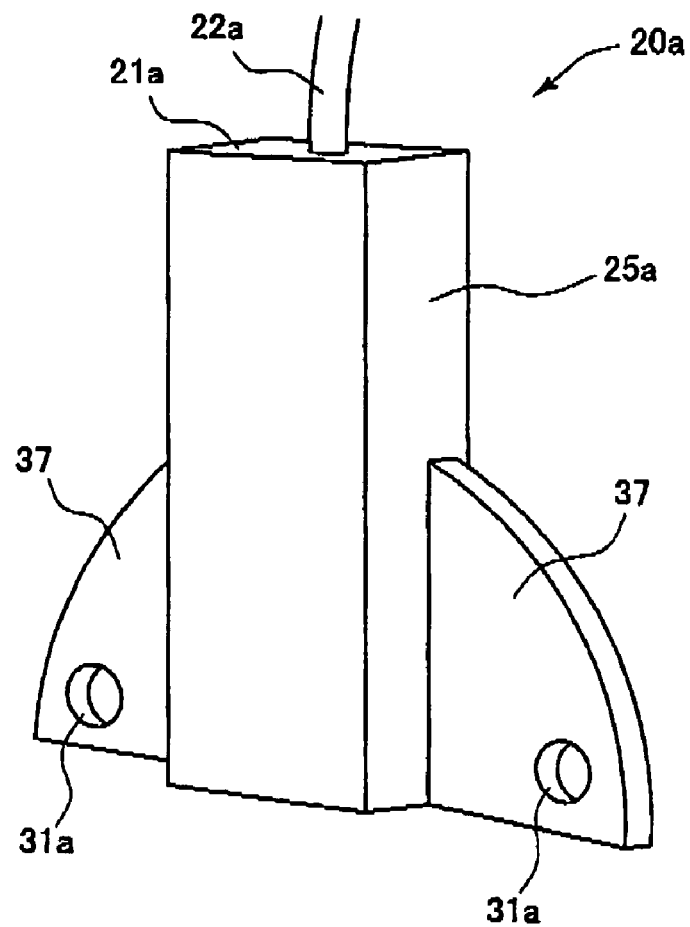
FIG. 18 is a perspective view of another embodiment of the ABS sensor.
Figure 19:
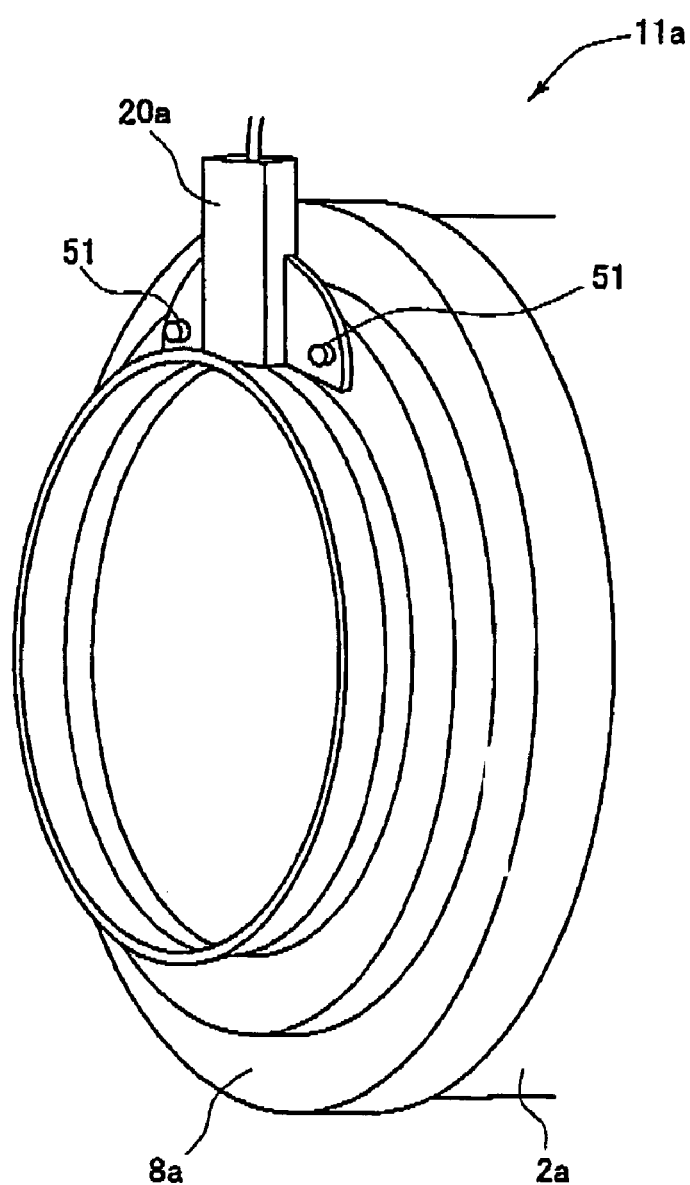
FIG. 19 is a perspective view of still another embodiment of the sensor-equipped rolling bearing device.

FIGS. 18 and 19 show an example of a still another embodiment. In a sensor-equipped bearing device 11a according to this example, the fixing member 30 is not employed, but the ABS sensor 20a is directly fixed to the cover 8a. The ABS sensor 20a, as shown in FIG. 18, is provided with a body 21a and a signal line 22a. The body 21a of the ABS sensor 20a has projections 37a on both side surfaces 25a, the projections 37a having holes 31a, respectively. Although the one side surface 25a is shown, another side surface 25a is located on the rear side opposite to the side surface 25a shown in FIG. 18.

As shown in FIG. 19, the hole 31a and the above hole 41 are connected by the bolt 51 in a state where the measuring portion of the ABS sensor 20a is located at the position of the sensor hole 45 so that the ABS sensor 20a is fixed to the cover 8a. In this way, by directly mounting the ABS sensor 20a in the cover 8a without using the fixing member 30, cost reduction can be realized. Fixing the ABS sensor 20a to the cover 8a should not be limited to bolting but may be also done by riveting.

In the sensor-equipped rolling bearing device according to this invention, after the fixing member 30 for fixing the ABS sensor 20, 20a and the cover 8a are bonded after formed as separate bodies and the ABS sensor 20, 20a is fixed to the fixing member 30 by riveting so that the cover 8a covers the magnet rotor 9 over the entire circumference thereof without being exposed in the axial direction. This realizes both fixing the ABS sensor 20, 20a and not exposing the magnet rotor to the outside.

Further, since the ABS sensor 20, 20a is fixed to the fixing member 30 by bolting or riveting using the hole 31a, 41, it can be fixed firmly in a simple way. This avoids an increase in the error of a measured value owing to misalignment of the position or posture of the sensor due to weak fixation.

Further, with the projections 37a being formed in the ABS sensor 20, 20a, the ABS sensor 20, 20a is fixed with the holes 31a being in the radial direction and the projecting direction of the projections 37a being in the axial direction. Therefore, the mechanism of fixing the ABS sensor 20, 20a to the cover 8a is projected in the radial direction to save the space. This is preferable in mounting the ABS sensor in the bearing.

The rails 35 and rail grooves 26 formed in the radial direction are fit to each other to position the sensor so that the movement of the sensor in the axial direction is limited. Thus, in cooperation with the limitation in the movement of the sensor in the radial direction and circumferential direction by the above bolting or riveting, the position and posture of the sensor can be further stabilized. Accordingly, generation of the error of the measured value of the sensor owing to misalignment of the position or posture thereof is restrained, thereby realizing the sensor-equipped bearing device 11 with high reliability for the measured value of the sensor.

What is claimed is:

1. A rolling bearing device comprising:
    an outer ring connected to a mounting opening of a knuckle on a vehicle inner side;
    an inner ring connected to a wheel on a vehicle outer side through a hub;
    rolling elements interposed between the outer and inner rings;
    a sealing device for sealing a space between the inner and outer rings from the outside;
    a drive shaft which passes through the inner ring and is rotatable together with the inner ring;
    a sealing member for limiting foreign substance invading the rolling bearing from a clearance existing between the drive shaft and the knuckle; and
    a magnet rotor fitted on the vehicle inner side of the sealing device,
    wherein the sealing member includes a ring-shaped elastic sealing body and a ring-shaped cover integrated to the sealing body,
    wherein the cover includes a cylinder press-fit in an outer or inner peripheral surface of the outer ring and a ring-shaped upstanding wall coupled with the cylinder, and
    wherein a drain hole is formed at a lower part of the cover so as to drain water, and has an inner diameter equal to or greater than an outer diameter of the magnet rotor.

2. A roller bearing device according to claim 1, wherein the cylinder contacts the outer or inner peripheral surface of the outer ring.

3. A roller bearing device according to claim 1, wherein the sealing body comprises an axially innermost portion of the sealing member.

4. A roller bearing device according to claim 1, wherein the outer ring comprises a level plane on an axially inward side of the outer ring, in which the level plane comprises an outer diameter less than an outer diameter of an adjacent portion of the outer ring which is disposed adjacent to the level plane, such that the cylinder, when fitted on the level plane, does not extend radially outward of the adjacent portion of the outer ring.

5. A roller bearing device according to claim 1, wherein the water comprises muddy water.

6. A roller bearing device according to claim 1, wherein the water comprises water having foreign substances therein.

7. A roller bearing device according to claim 1, wherein the water comprises contaminated water.

* * * * *